United States Patent
Karpov et al.

(10) Patent No.: US 6,650,287 B1
(45) Date of Patent: Nov. 18, 2003

(54) METHOD FOR DETERMINING THE POSITION OF REFERENCE AXES IN AN INERTIAL NAVIGATION SYSTEM OF AN OBJECT IN RESPECT WITH THE BASIC COORDINATES AND EMBODIMENTS THEREOF

(75) Inventors: Anatoly Stepanovich Karpov, ulitsa Kropotkina, d.1, kv.128, 394030 Voronezh (RU); Vladimir Sergeevich Rachuk, ulitsa Sredne-Moskovskaya, d.69, kv.125, 394030 Voronezh (RU); Robert Konstantinovich Ivanov, ulitsa Semashko, d.26, korpus 1, kv.204, 141014 Moskovskaya oblast, Mytischi (RU); Jury Vladimirovich Monakhov, Korolev (RU); Mikhail Markovich Kovalevsky, Moscow (RU); Andrei Vladimirovich Borisov, Korolev (RU)

(73) Assignees: Anatoly Stepanovich Karpov, Voronezh (RU); Vladimir Sergeevich Rachuk, Voronezh (RU); Robert Konstantinovich Ivanov, Moskovskaya (RU)

(*) Notice: Subject to any disclaimer, the term of this patent is extended or adjusted under 35 U.S.C. 154(b) by 0 days.

(21) Appl. No.: 10/048,176
(22) PCT Filed: Jul. 29, 1999
(86) PCT No.: PCT/RU99/00260
§ 371 (c)(1), (2), (4) Date: Jan. 29, 2002
(87) PCT Pub. No.: WO01/09637
PCT Pub. Date: Feb. 8, 2001

(51) Int. Cl.[7] .............................................. H04B 7/185
(52) U.S. Cl. .............................. 342/357.14; 342/357.01
(58) Field of Search .......................... 342/457, 357.01, 342/357.02, 357.06, 357.14; 701/213, 215, 300

(56) References Cited

U.S. PATENT DOCUMENTS

| 4,672,382 A | 6/1987 | Fukuhara et al. |
| 4,898,349 A | 2/1990 | Miller |
| 5,001,647 A | 3/1991 | Rapiejko et al. |
| 5,910,789 A | 6/1999 | Vigen |
| 5,986,604 A | 11/1999 | Nichols et al. |

FOREIGN PATENT DOCUMENTS

| EP | 0372923 | 6/1990 |
| EP | 0415681 | 3/1991 |
| RU | 2033949 | 4/1995 |
| RU | 2073210 | 2/1997 |

OTHER PUBLICATIONS

G.A. Khlebnikov, "Determination of Angular Orientation" Initial Alignment of Inertial Navigation Systems, pp. 225–228, Moscow 1994, Dzerjinsky Military Academy.

(List continued on next page.)

Primary Examiner—Dao Phan
(74) Attorney, Agent, or Firm—Burns, Doane, Swecker & Mathis, LLP

(57) ABSTRACT

A method for determining a position of reference axes in an inertial navigation system of an object with respect to a basic coordinate system is provided. The method includes measuring coordinates and/or speed in a basic coordinate system and an inertial coordinate system at moments of time. The method measures an acceleration vector in the inertial coordinate system at a trajectory portion of the moments of time which allows measuring of the coordinates and/or the speed. The coordinates and speed are determined by similarities in the coordinate systems at the moments of time in a portion not parallel to the trajectory portion where measurements have been made. Vectors corresponding to displacements and/or to an increase of speed of the object in the coordinate systems are determined for at least two portions of the trajectory. The vectors are used to determine a matrix of transfer between the coordinate systems.

6 Claims, 1 Drawing Sheet

OTHER PUBLICATIONS

G.A. Khlebnikov, "Determination of Orientation of Gyroscopic System of Coordinates in Flight" Initial Alignment of Inertial Navigation Systems, pp. 230–231, Moscow 1994, Dzerjinsky Military Academy.

G.A. Khlebnikov, "Method of Matching (Transmitting) The Position" Inital Alignment of Inertial Navigation Systems, p. 237, Moscow 1994, Dzerjinsky Military Academy.

Prof. Yu.M. Kazarinov, "Second Generation Satellite Radio Navigation Systems", Radio Engineering Systems, pp. 302–306, Moscow "Vyshaya Shkola" 1990.

ized in that the matrix of transfer between the basic coordinate system and the object's inertial coordinate system is determined from the set of equations:

METHOD FOR DETERMINING THE POSITION OF REFERENCE AXES IN AN INERTIAL NAVIGATION SYSTEM OF AN OBJECT IN RESPECT WITH THE BASIC COORDINATES AND EMBODIMENTS THEREOF

FIELD OF THE INVENTION

The present invention relates to the field of navigation of various objects, moving in inertial space and equipped with on-board inertial navigation systems.

Among such objects may be land-based and sea-going vehicles (motor vehicles, watercraft), as well as aircraft and spacecraft (airplanes, rockets, space vehicles).

BACKGROUND OF THE INVENTION

A method is known for determining the position of a three-axis navigation system by simultaneously measuring gravitational acceleration and angular velocity of Earth rotation [1].

The method is mainly used for the initial alignment of inertial systems of objects which are stationary relative to Earth, wherewith the geographical coordinate system is often used as the basic coordinate system. The method cannot be applied to moving objects subjected to acceleration and angular velocity.

A method is known for determining the position of a three-axis navigation system in relation to a basic coordinate system set by known optical directions [2].

The method is used both for the initial alignment of the axis of a navigation system of stationary objects in accordance with known directions, for example, in the direction of selected stars, and in the process of movement of the object.

A method is also known for astronavigation in accordance with patent RU No. 2033949, IPC⁶ B64G 1/24, which provides for coincidence of a common plane of sensitivity of Earth and Polaris sensors, including a space vehicle's longitudinal axis, with the plane "earth's center—spacecraft—Polaris" (based on measured yaw, pitch and roll angular errors), wherewith the inertial longitude of the spacecraft position is determined according to the azimuth of the rotation angle in the field of view of the star sensor of a selected star around the "spacecraft—Polaris" direction in relation to a reference base and taking into account the inertial longitude of that reference base, the parameters of which are stored. The reference base—a plane comprising "spacecraft—Polaris" and "spacecraft—navigation star" directions—is characterized by an inertial longitude equal to the direct ascension of Polaris and is turned relative to the common plane of sensitivity of Earth and Polaris sensors by an angle equal to the angle between the plane containing the "earth center—Polaris" and "earth center—celestial pole" direction and the plane containing the "earth center—Polaris" and "earth center—navigation star" direction.

These methods, however, require the presence of optical means on board the object, such as star sights, and optical contact with reference points. As regards land-based objects and atmospheric aerocraft prone to weathering, the method's utilization is restricted by the employment of optical means.

The analog most similar to the proposed method for determining the position of reference axes in an inertial navigation system of an object in respect with the basic coordinates is the method based on the simultaneous measurement of the acceleration vector in the basic system and in the system being defined [3]. Wherewith the acceleration vector is measured in at least two trajectory points, where the measured acceleration vectors are unparallel.

This method may be employed only in those cases where the basic coordinate system and the object's coordinate system experience the same acceleration, that is, the basic system's carrier and the object are mechanically coupled and move along the same trajectory. For example—an aircraft (object) on the deck of an aircraft carrier (carrier of the basic system), a rocket (object) aboard a carrier aircraft (carrier of the basic system).

The method is feasible in practice in those cases when the basic coordinate system is known with a better measurement accuracy than the coordinate system of the object, and also when the accuracy of the basic coordinate system is sufficient to solve the navigation task of the object.

In practice, these conditions are often not met and the method cannot be employed. For example, a launch vehicle should have an accuracy or orientation of the axes of the inertial system which is not worse than units of angular minutes, while a carrier aircraft at the moment of launch of a launch vehicle may have an orientation of the axes of the basic coordinate system with an error of tens of angular minutes.

DISCLOSURE OF THE INVENTION

The object of the present invention is to enhance the accuracy and reliability of determining the position of the reference axes in an inertial navigation system of a moving object, as well as to ensure all-weather determination.

This object is achieved in that in embodiment 1 of a method for determining the position of reference axes in an inertial navigation system of an object in respect with the basic coordinate system, comprising navigation measurements of an object moving in inertial space, in a basic coordinate system and in the inertial coordinate system of the object.

at moments of time $t_i$ and $t_{i-1}$, the coordinates of the moving object are measured in a coordinate system of a global navigation system, like "GLONAS" or/and "NAVSTAR," selected as the basic coordinate system.

at the $t_i$–$t_{i-1}$ trajectory portion, the acceleration vector is measured in the inertial coordinate system of the object, in accordance with which the object's coordinates are determined at the same moments of time $t_i$ and $t_{i-1}$;

at the moments of time $t_j$ and $t_{j+1}$ at an object trajectory portion which is not parallel with the portion of the preceding navigation measurements, similar measurements of the object's coordinates are performed in the basic coordinate system and in the object's inertial coordinate system;

then on the basis of the coordinates determined at each portion of the trajectory $t_i$–$t_{i+1}$ and $t_j$–$t_{j-1}$, which are selected to be at least two, displacement vectors $L_i$, $L_j$ of the object are determined in the basic coordinate system $L_i^B$, $L_j^B$ and in the object's inertial coordinate system $L_i^U$, $L_j^U$;

next, the matrix of transfer between the basic coordinate system and the object's inertial coordinate system is determined from the set of equations:

$$L_i^B = AL_i^U,$$

$$L_j^B = AL_j^U,$$

$$i,j=1\ldots n,\ i\neq j,$$

where A—matrix of transfer from the basic coordinate system to the object's inertial coordinate system, n—number of trajectory portions;

then according to the matrix A components, the position of the reference axes in the inertial navigation system of the object is determined in relation to the basic system.

In embodiment 2 of a method for determining the position of reference axes in an inertial navigation system of an object with basic coordinates, comprising navigation measurements of an object moving in inertial space, in a basic coordinate system and in the inertial coordinate system of the object:

at moments of time $t_i$ and $t_{i-1}$, the speed vector of the moving object is measured in a coordinate system of a global navigation system, like "GLONAS" or/and "NAVSTAR," selected as the basic coordinate system;

at the $t_i$–$t_{i+1}$ trajectory portion, the acceleration vector is measured in the inertial coordinate system of the object, in accordance with which the speed vector of the object is determined at the same moments of time $t_i$ and $t_{i+1}$;

at the moments of time $t_j$ and $t_{j-1}$, at an object trajectory portion which is not parallel with the portion of the preceding navigation measurements, similar measurements of the object's speed vector are performed in the basic coordinate system and in the object's inertial coordinate system.

then on the basis of the speed vectors determined at each portion of the trajectory $t_i$–$t_{i+1}$ and $t_j$–$t_{j+1}$, which are selected to be at least two, the speed vector increments $\Delta V_i$ and $\Delta V_j$ of the object are determined in the basic coordinate system $\Delta V_i^B$, $\Delta V_j^B$ and in the object's inertial coordinate system $\Delta V_i^U$, $\Delta V_j^U$;

next, the matrix of transfer between the basic coordinate system and the object's inertial coordinate system is determined from the set of equations:

$$\Delta V_i^B = A \Delta V_i^U,$$

$$\Delta V_j^B = A \Delta V_j^U,$$

$$i,j = 1 \ldots n, \; i \neq j,$$

where A—matrix of transfer from the basic coordinate system to the object's inertial coordinate system, n—number of trajectory portions;

then according to the matrix A components, the position of the reference axes of the inertial navigation system of the object is determined in relation to the basic system.

In embodiment 3 of a method for determining the position of reference axes in an inertial navigation system of an object in respect with basic coordinates, comprising navigation measurements of an object moving in inertial space, in a basic coordinate system and in the inertial coordinate system of the object.

at moments of time $t_i$ and $t_{i+1}$, the coordinates and speed vector of the moving object are measured in a coordinate system of a global navigation system, like "GLONAS" or/and "NAVSTAR," selected as the basic coordinate system;

at the $t_i$–$t_{i+1}$ trajectory phase, the acceleration vector is measured in the inertial coordinate system of the object, in accordance with which the object's coordinates and speed vector are determined at the same moments of time $t_i$ and $t_{i+1}$;

at the moments of time $t_j$ and $t_{j+1}$, at an object trajectory portion which is not parallel with the portion of the preceding navigation measurements, similar measurements of the object's coordinates and speed vector are performed in the basic coordinate system and in the object's inertial coordinate system;

then on the basis of the coordinates and speed vectors determined at each portion of the trajectory $t_i$–$t_{i+1}$ and $t_j$–$t_{j+1}$, which are selected to be at least two, displacement vectors $L_i$, $L_j$ and speed vector increments $\Delta V_i$–$\Delta V_j$ of the object are determined in the basic coordinate system $L_i^B$, $L_j^B$, $\Delta V_i^B$, $\Delta V_j^B$ and in the object's inertial coordinate system $L_i^U$, $L_j^U$, $\Delta V_i^U$, $\Delta V_j^U$;

next, the matrix of transfer between the basic coordinate system and the object's inertial coordinate system is determined from the set of equations:

$$L_i^B = A L_i^U, \; \Delta V_i^B = A \Delta V_i^U$$

$$L_j^B = A L_i^U, \; \Delta V_j^B = A \Delta V_j^U$$

$$i,j = 1 \ldots n, \; i \neq j,$$

where A—matrix of transition from the basic coordinate system to the object's inertial coordinate system.

n—number of trajectory portions;

then according to the matrix A components, the position of the reference axes of the inertial navigation system of the object is determined in relation to the basic system.

According to the present method, a maneuver of an object moving along a rectilinear trajectory in inertial space is executed, which ensures at least two non-parallel trajectory portions where the mentioned navigation measurements are carried out.

BRIEF DESCRIPTION OF THE DRAWING

The method's essence is shown in FIG. 1, where:

1-object;

Figure 1:
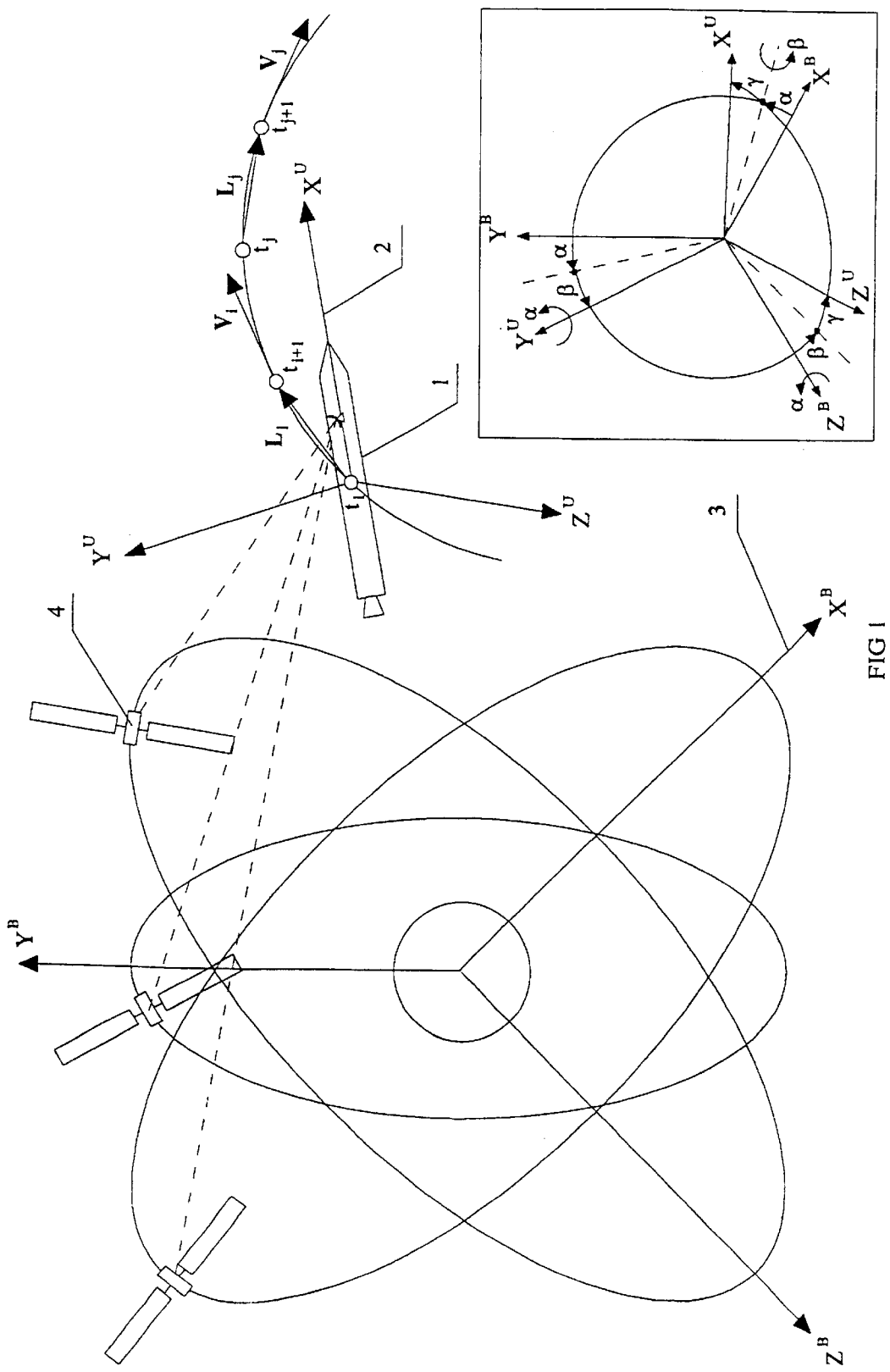

2-reference axes in inertial navigation system of object $X^U$, $Y^U$, $Z^U$;

3-axes of coordinates of basic system $X^B$, $Y^B$, $Z^B$;

4-global navigation system "GLONAS" ("NAVSTAR");

$t_i$, $t_{i+1}$, $t_j$ and $t_{j+1}$—moments of time, wherein the moving object's coordinates in a basic coordinate system like "GLONAS" or/and "NAVSTAR" and in the object's inertial coordinate system are determined.

$L_i$, $L_j$—the object's displacement vectors at the trajectory portions $t_i$–$t_{i+1}$ and $t_j$–$t_{j+1}$ respectively;

$\Delta V_i$ and $\Delta V_j$-speed vector increments at the trajectory portions $t_i$–$t_{i+1}$ and $t_j$–$t_{j+1}$ respectively;

α, β, γ—angles determining the position of the reference axes of the object's inertial navigation system $X^U$, $Y^U$, $Z^U$ relative to the axes of coordinates of the basic system $X^B$, $Y^B$, $Z^B$ (Euler angles).

DESCRIPTION OF THE PREFERRED EMBODIMENTS

The present method is distinctive over the known analogs in that in embodiments 1:

at moments of time $t_i$ and $t_{i+1}$, the coordinates of a moving object 1 are measured in a coordinate system 3 of a global navigation system 4, selected as the basic coordinate system [4];

at the same moments of time $t_i$ and $t_{i+1}$ the same coordinates of the object 1 in the inertial navigation coordinate system 2 of the object are determined by measurements of the acceleration vector at the $t_i$–$t_{i+1}$ trajectory portion;

at the moments of time $t_j$ and $t_{j-1}$, at an object 1 trajectory portion which is not parallel with the portion of the preceding navigation measurements, similar measurements of the object's coordinates are made in the basic coordinate system 3 and in the inertial coordinate system 2;

then on the basis of the object's 1 coordinates determined at each portion of the trajectory $t_i-t_{i+1}$ and $t_j-t_{j+1}$, which are selected to be at least two, displacement vectors $L_i$, $L_j$ are determined in the basic coordinate system 3 $L_i^B$, $L_j^B$ and in the object's inertial coordinate system 2 $L_i^U$, $L_j^U$;

next the displacement angles between the basic coordinate system 3 and the object's inertial coordinate system 2 are determined from the set of equations:

$$L_i^B = Al_i^U,$$
$$L_j^B = Al_j^U,$$
$$i, j = 1, \ldots n, i \neq j,$$

where A—matrix of transfer from the basic coordinate system 3 to the object's inertial coordinate system 2, n—number of trajectory portions;

then according to the matrix of transfer A components, the position of the reference axes of the inertial navigation system 2 of the object is determined in relation to the basic system 3; i.e. the displacement angles between them $\alpha$, $\beta$, $\gamma$ (Euler angles).

The method is also distinctive in that in embodiment 2:

at moments of time $t_i$ and $t_{i+1}$, the speed vector of the moving object 1 is measured in a coordinate system 3 of a global navigation system 4, like "GLONAS" (or/and "NAVSTAR"), selected as the basic coordinate system;

at the $t_i-t_{i+1}$ trajectory portion, the acceleration vector is measured in the inertial coordinate system 2 of the object, in accordance with which the speed vector of the object is determined at the same moments of time $t_i$ and $t_{i-1}$;

at the moments of time $t_j$ and $t_{j+1}$, at an object trajectory portion which is not parallel with the portion of the preceding navigation measurements, similar measurements of the object's speed vector are made in the basic coordinate system 3 and in the object's inertial coordinate system 2;

then on the basis of the speed vectors determined at each portion of the trajectory $t_i-t_{i+1}$ and $t_j-t_{j+1}$, which are selected to be at least two, the object's speed vector increments $\Delta V_i$, $\Delta V_j$ are determined in the basic coordinate system 3 $\Delta V_i^B$, $\Delta V_j^B$ and in the object's inertial coordinate system 2 $\Delta V_i^U$, $\Delta V_j^U$;

next, the matrix of transfer between the basic coordinate system 3 and the object's inertial coordinate system 2 is determined from the set of equations:

$$\Delta V_i^B = A\Delta V_i^U,$$
$$\Delta V_j^B = A\Delta V_j^U,$$
$$i,j=1 \ldots n, i \neq j,$$

where A—matrix of transfer from the basic coordinate system to the object's inertial coordinate system, n—number of trajectory portions;

then according to the matrix A components, the position of the reference axes of the inertial navigation system 2 of the object is determined in relation to the basic system 3.

The proposed method in accordance with embodiment 3 is distinctive in that:

at moments of time $t_i$ and $t_{i+1}$, the coordinates and speed vector of the moving object 1 are measured in a coordinate system of a global navigation system 4, like "GLONAS" or/and "NAVSTAR," selected as the basic coordinate system;

at the $t_i-t_{i+1}$ trajectory portion, the acceleration vector is measured in the inertial coordinate system 2 of the object, in accordance with which the object's coordinates and speed vector are determined at the same moments of time $t_i$ and $t_{i+1}$;

at the moments of time $t_j$ and $t_{j+1}$, at an object 1 trajectory portion which is not parallel with the portion of the preceding navigation measurements, similar measurements of the object's coordinates and speed vector are made in the basic coordinate system 3 and in the object's inertial coordinate system 2;

then on the basis of the coordinates and speed vectors determined at each portion of the trajectory $t_i-t_{i+1}$ and $t_j-t_{j+1}$, which are selected to be at least two, displacement vectors $L_i$, $L_j$ and speed vector increments $\Delta V_i$ and $\Delta V_j$ of the object are determined in the basic coordinate system 3 $L_i^B$, $L_j^B$, $\Delta V_i^B$, $\Delta V_j^B$ and in the object's inertial coordinate system 2 $L_i^U$, $L_j^U$, $\Delta V_i^U$, $\Delta V_j^B$;

next, the matrix of transfer between the basic coordinate system 3 and the object's inertial coordinate system 2 is determined from the set of equations:

$$L_i^B = AL_i^U, \Delta V_j^B = A\Delta V_i^U$$
$$L_j^B = AL_j^U, \Delta V_j^B = A\Delta V_j^U$$
$$i,j=1 \ldots n, i \neq j,$$

where A—matrix of transition from the basic coordinate system to the object's inertial coordinate system, n—number of trajectory portions;

then according to the matrix A components, the position of the reference axes of the inertial navigation system 2 of the object is determined in relation to the basic system 3.

The method is also distinctive in that during the movement of an object 1 along a rectilinear trajectory in inertial space, a maneuver of the object is executed, which ensures at least two non-parallel trajectory portions where the navigation measurements are carried out.

The proposed method for determining the position of the reference axes of the navigation system of a moving object makes it possible to determine with high accuracy (up to ten meters) large displacements of objects (thousands of kilometers) in any weather conditions with the aid of global navigation systems of the "GLONAS" or/and "NAVSTAR" type, which operate in the radio frequency band.

For example, the accuracy of determining the position of reference axes of the navigation systems of such moving objects as aircraft, rockets, spacecraft, which may travel over considerable distances, may be units of seconds of arcs.

The absence of the effect of weather conditions on navigation measurements with the aid of the "GLONAS" or "NAVSTAR" systems, as distinctive over astronavigation systems, ensures the method's high reliability and all-weather use.

INDUSTRIAL APPLICABILITY

An example of realization of the proposed method for determining the position of reference axes in an inertial navigation system of an object may be an aerospace system which uses industrially-produced carrier aircraft and launch vehicles launched from such aircraft. Carrier aircraft, as a rule, have navigation systems with an accuracy of axes orientation which reaches tens of angular minutes, but this is insufficient for a launch vehicle launched from such aircraft, the accuracy of orientation of the axes of the navigation system of which should not be worse than units of angular minutes, which is realized in the proposed method.

REFERENCES

1. Khlenikov, G. A., "Initial Alignment of Inertial Navigation Systems," Dzerjinsky Military Academy, Moscow, 1994, pp. 225–228.
2. Ibid. pp. 230–231.
3. Ibid. pp. 237.
4. "Radio Engineering Systems," edited by Kazarinov Y. M. et al., Vyshaya Shkola, Moscow, 1990, pp. 304–306.

What is claimed is:

1. A method for determining a position of reference axes in an inertial navigation system of an object in respect with a basic coordinate system, comprising navigation measurements of the object moving in inertial space, in the basic coordinate system and in the inertial coordinate system of the object, wherein:

at moments of time $t_i$ and $t_{i+1}$, coordinates of the moving object are measured in a coordinate system of a global navigation system where "GLONAS" or/and "NAVSTAR" are selected as the basic coordinate system;

at a $t_i$–$t_{i+1}$ trajectory portion, an acceleration vector is measured in the inertial coordinate system of the object, in accordance with which the object coordinates are determined at the same moments of time $t_i$ and $t_{i+1}$;

at moments of time $t_j$ and $t_{j+1}$ at an object trajectory portion which is not parallel with the portion of preceding navigation measurements, similar measurements of the object coordinates are made in the basic coordinate system and in the inertial coordinate system of the object;

then on a basis of the coordinates determined at each portion of the trajectory $t_i$–$t_{i+1}$ and $t_j$–$t_{j+1}$, which are selected to be at least two, displacement vectors $L_i$, $L_j$ of the object are determined in the basic coordinate system $L_i^B$, $L_j^B$ and in the inertial coordinate system of the object 1 $L_i^U$, $L_j^U$;

next, a matrix of transfer between the basic coordinate system and the inertial coordinate system of the object is determined from a set of equations:

$$L_i^B = A L_i^U,$$

$$L_j^B = A L_j^U,$$

$$i,j = 1 \ldots n, \ i \neq j,$$

where A—matrix of transfer from the basic coordinate system to the inertial coordinate system of the object, n—number of trajectory portions;

then according to matrix A components, the position of the reference axes in the inertial navigation system of the object is determined in respect with the basic system.

2. A method for determining a position of reference axes in an inertial navigation system of an object in respect with a basic coordinate system, comprising navigation measurements of the object moving in inertial space, in the basic coordinate system and in the inertial coordinate system of the object, wherein:

at moments of time $t_i$, and $t_{i+1}$, a speed vector of the moving object is measured in a coordinate system of a global navigation system where "GLONAS" or/and "NAVSTAR" are selected as the basic coordinate system;

at a $t_i$–$t_{i+1}$ trajectory portion, an acceleration vector is measured in the inertial coordinate system of the object, in accordance with which the object's coordinates are determined at the same moments of time $t_i$ and $t_{i+1}$;

at moments of time $t_j$ and $t_{j+1}$, at an object trajectory portion which is not parallel with the portion of preceding navigation measurements, similar measurements of the object speed vector are made in the basic coordinate system and in the inertial coordinate system of the object;

then on a basis of the speed vectors determined at each portion of the trajectory $t_1$–$t_{i+1}$ and $t_j$–$t_{j+1}$, which are selected to be at least two, the object speed vector increments $\Delta V_1$ and $\Delta V_7$ are determined in the basic coordinate system $\Delta V_i^B$, $\Delta V_j^B$ and in the object's intertial coordinate system 2 $\Delta V_i^U$, $\Delta V_j^U$;

next, a matrix of transfer between the basic coordinate system and the inertial coordinate system of the object is determined from a set of equations:

$$\Delta V_i^B = A \Delta V_i^U,$$

$$\Delta V_j^B = A \Delta V_j^U,$$

$$i,j = 1 \ldots n, \ i \neq j,$$

where A—matrix of transfer from the basic coordinate system to the inertial coordinate system of the object, n—number of trajectory portions;

then according to matrix A components, the positions of the reference axes of the inertial navigation system of the object is determined in relation to the basic system.

3. A method for determining a position of reference axes in an inertial navigation system of an object in respect with a basic coordinate system, comprising navigation measurements of the object moving in inertial space, in the basic coordinate system and in the inertial coordinate system of the object, wherein:

at moments of time $t_i$ and $t_{i+1}$, coordinates and a speed vector of the moving object are measured in a coordinate system of a global navigation system, where "GLONAS" or/and "NAVSTAR" are selected as the basic coordinate system;

at a $t_i$–$t_{i+1}$ trajectory portion, an acceleration vector is measured in the inertial coordinate system of the object, in accordance with which the coordinates and speed vector of the object 1 are determined at the same moments of time $t_i$ and $t_{i+1}$;

at moments of time $t_j$ and $t_{j+1}$, at an object trajectory portion which is not parallel with the portion of the preceding navigation measurements, similar measurements of the coordinates and the speed vector of the object are made in the basic coordinate system and in the inertial coordinate system of the object;

then on the basis of the coordinates and speed vectors determined at each portion of the trajectory $t_i$–$t_{i+1}$ and $t_j$–$t_{j+1}$, which are selected to be at least two, displacement vectors $L_i$, $L_j$ and speed vector increments $\Delta V_i$, $\Delta V_j$ of the object are determined in the basic coordinate system $L_i^B$, $L_j^B$, $\Delta V_i^B$, $\Delta V_j^B$ and in the inertial coordinate system of the object $L_i^U$, $L_j^U$, $\Delta V_i^U$, $\Delta V_j^U$;

next, a matrix of transfer between the basic coordinate system and the inertial coordinate system of the object is determined from a set of equations:

$$L_i^B = AL_i^U, \quad \Delta V_i^B = A\Delta V_i^U$$

$$L_j^B = Al_j^U, \quad \Delta V_j^B = A\Delta V_j^U$$

$$i,j = 1 \ldots n, \quad i \neq j,$$

where A—matrix of transition from the basic coordinate system to the inertial coordinate system of the object, n—number of trajectory portions;

then according to matrix A components, the position of the reference axes of the inertial navigation system of the object is determined in relation to the basic system.

4. A method according to claim 1, wherein during movement of an object along a rectilinear trajectory in inertial space, a maneuver is executed, which ensures at least two non-parallel trajectory portions where navigation measurements are carried out.

5. A method according to claim 2, wherein during movement of an object along a rectilinear trajectory in inertial space, a maneuver is executed, which ensures at least two non-parallel trajectory portions where navigation measurements are carried out.

6. A method according to claim 3, wherein during movement of an object along a rectilinear trajectory in inertial space, a maneuver is executed, which ensures at least two non-parallel trajectory portions where navigation measurements are carried out.

* * * * *